G. GOETZ.
AUTOMATIC CAR WEIGHING AND RECORDING SCALE.
APPLICATION FILED MAY 27, 1909.
978,874.
Patented Dec. 20, 1910.
3 SHEETS—SHEET 2.
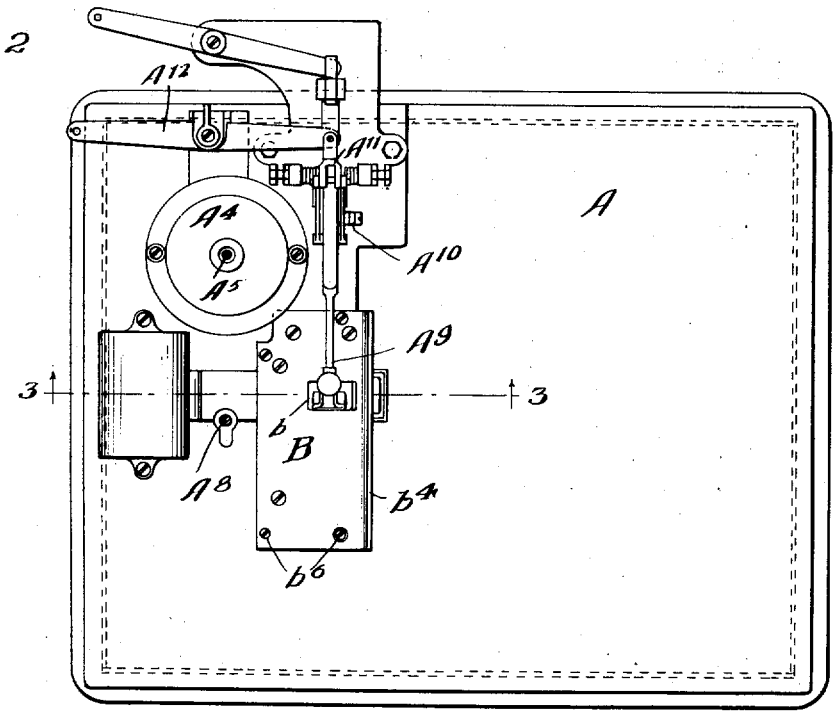
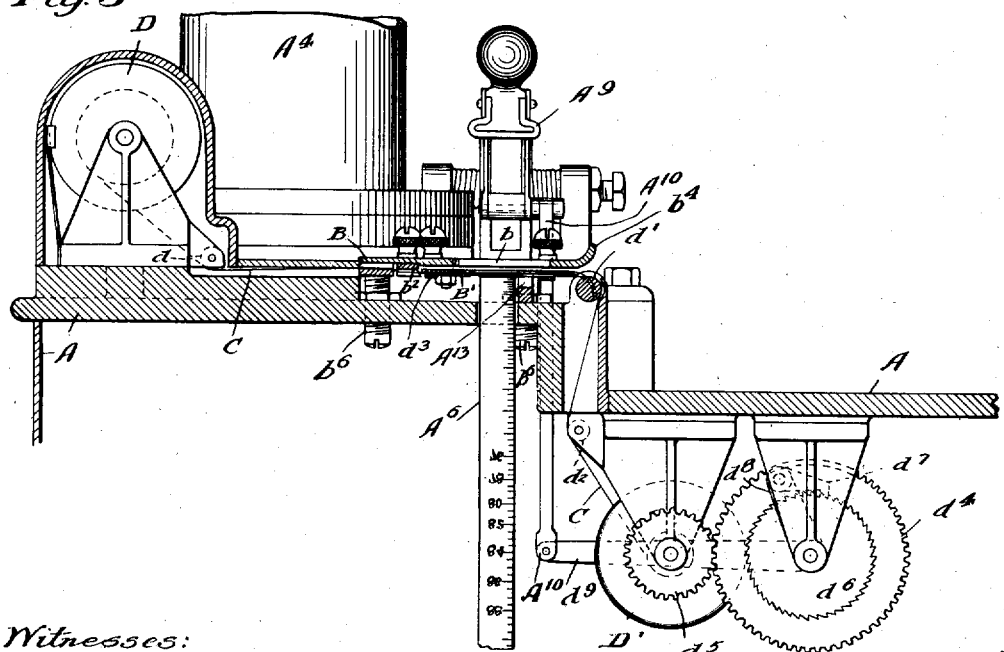
Witnesses:
Wm. Geiger
H. W. Munday
Inventor:
George Goetz
By Munday, Evarts, Adcock & Clarke,
Attorneys G. GOETZ.
AUTOMATIC CAR WEIGHING AND RECORDING SCALE.
APPLICATION FILED MAY 27, 1909.
978,874.
Patented Dec. 20, 1910.
3 SHEETS—SHEET 3.
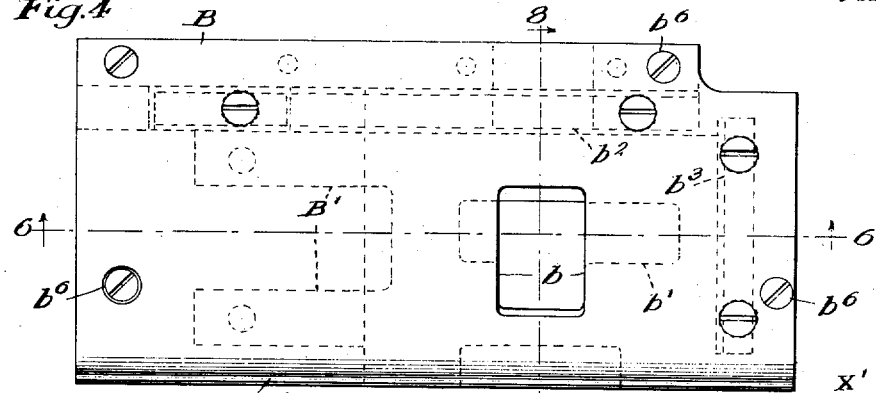
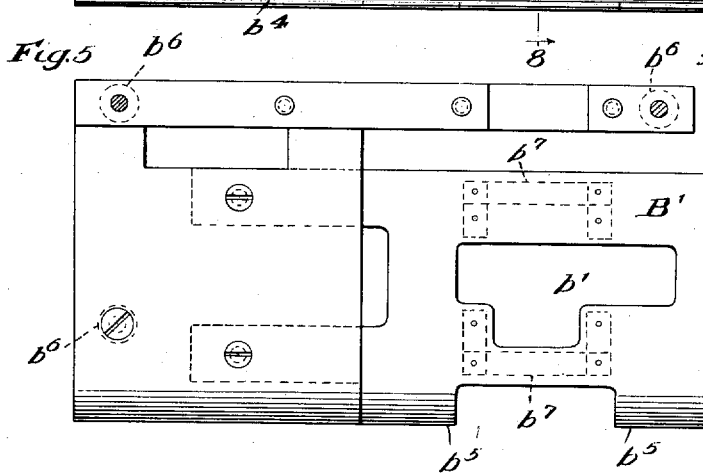
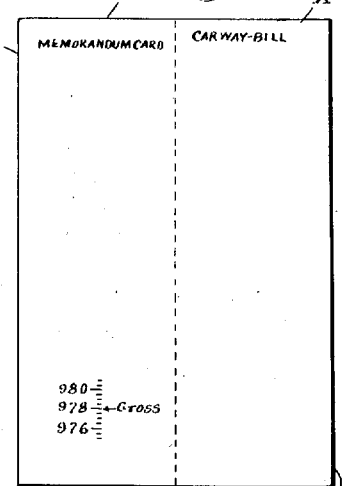
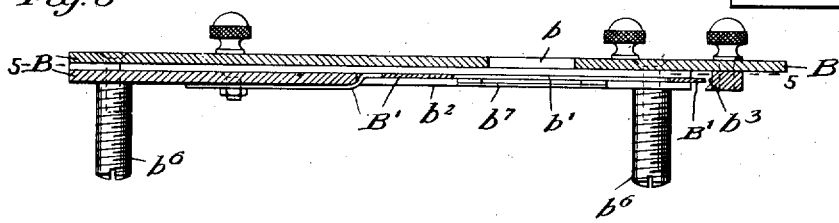
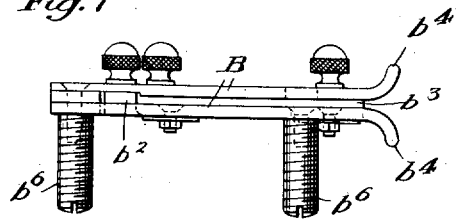
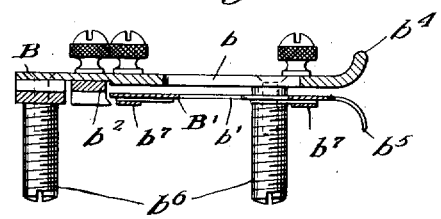
Witnesses
Wm Geiger
H. M. Munday
Inventor:
George Goetz
By Munday, Evarts, Adcock & Clarke,
Attorneys

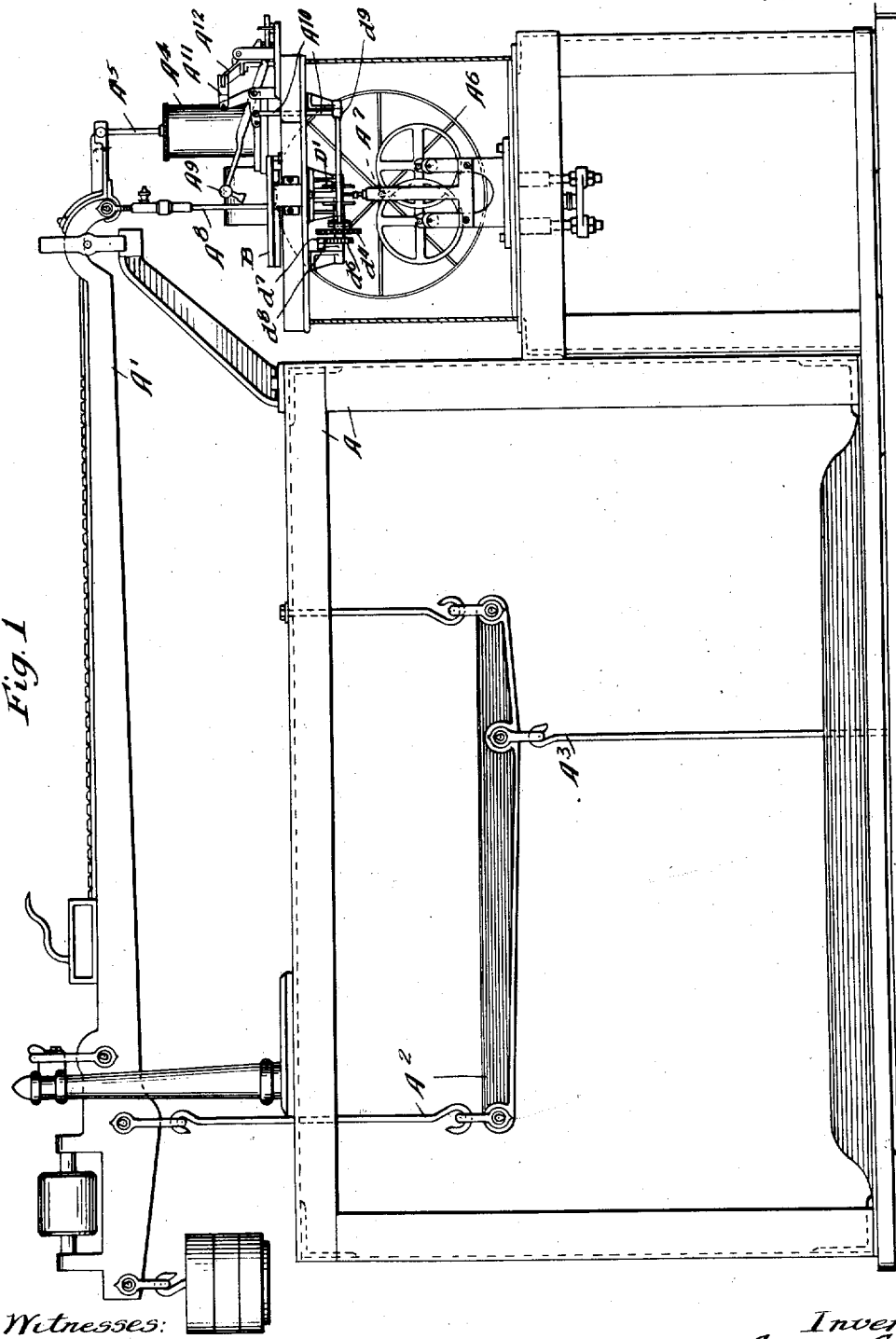

UNITED STATES PATENT OFFICE.

GEORGE GOETZ, OF CHICAGO, ILLINOIS, ASSIGNOR TO STREETER-AMET WEIGHING & RECORDING COMPANY, OF CHICAGO, ILLINOIS, A CORPORATION OF ILLINOIS.

AUTOMATIC CAR WEIGHING AND RECORDING SCALE.

978,874.

Specification of Letters Patent. Patented Dec. 20, 1910.

Application filed May 27, 1909. Serial No. 498,777.

*To all whom it may concern:*

Be it known that I, GEORGE GOETZ, a citizen of the United States, residing in Chicago, in the county of Cook and State of Illinois, have invented a new and useful Improvement in Automatic Car Weighing and Recording Scales, of which the following is a specification.

My invention relates to scales for automatically weighing and recording weights of cars, and more particularly to improvements upon the automatic weighing and recording car scales of my Patents Nos. 651,845, 778,358 and 778,359.

In the weighing and recording car scales of my said prior patents, the recording or printing wheel prints the weight of each car as it passes over the scale platform upon a continuous ribbon or strip of paper which is automatically fed transversely across the face of the weight printing or recording wheel, the printing being done by the stroke of the impression hammer.

The object of my present improvement is to adapt my car weighing and recording scale of my said prior patents to print the weights of the cars as they pass over the scale platform upon the ordinary commercial way-bill cards used by the railway companies.

My invention consists in the means I have constructed and devised for practically accomplishing this object or result as herein shown and described and more particularly specified in the claims.

In the accompanying drawing forming a part of this specification, I have only shown those portions of my car weighing and recording scale to which my present improvements particularly relate, and I would refer to the specification and drawings of my said prior patents for a full description of the construction and operation of the other portions of the apparatus, such other portions being preferably constructed substantially in accordance with the specification and drawings of one or the other of my said prior patents.

In said drawing, Figure 1 is a side elevation, partly in vertical section, of a car weighing and recording scale embodying my invention, the same showing, however, only that portion of the complete apparatus to which my present improvement particularly relates. Fig. 2 is a detail plan view. Fig. 3 is a vertical section on line 3—3 of Fig. 2. Fig. 4 is a detail plan view of the way-bill card holder. Fig. 5 is a detail plan view, partly in horizontal section, on line 5—5 of Fig. 6. Fig. 6 is a detail section on line 6—6 of Fig. 4. Fig. 7 is a detail end elevation of the way-bill card holder. Fig. 8 is a detail section on line 8—8 of Fig. 4 and Fig. 9 is a detail plan view of the card way-bill, upon one detachable flap of which the weight of the card is printed or recorded.

In the drawing, A represents the frame of a car weighing and recording scale embodying my invention, $A^1$ the scale beam connected by customary links and levers $A^2$ $A^3$ with the scale platform over which the cars to be weighed pass, $A^4$ the dash-pot having its piston stem $A^5$ connected with the scale beam, $A^6$ the weight printing or recording wheel, the shaft $A^7$ of which is furnished with a gear meshing with a rack that is connected by a connecting link or rod $A^8$ with the scale beam and actuated thereby, $A^9$ the impression hammer, $A^{10}$ the impression hammer lever, $A^{11}$ $A^{12}$ connecting links and levers through which the operation of the impression hammer is actuated or controlled, and $A^{13}$ the stationary pointer mark printing type adjacent to the printing wheel. All these parts may be of any suitable construction, and need no further description, the same being substantially constructed in accordance with the specifications and drawings of one or the other of my said prior patents, and being well known to those skilled in the art.

To enable the weight of each car passing over the scale platform to be clearly and distinctly recorded or printed upon the large, heavy, doubled or folded railway commercial way-bill card X having a detachable flap $X^1$, such as shown in the drawing, (see Fig. 9), by the coöperative action of the printing wheel and impression hammer without danger of the heavy, folded card interfering with the accuracy of the weight and the delicate movement of the printing wheel under action of the scale beam and its counterbalance spring and dash-pot, I provide and coöperatively combine with these parts a way bill card holder B, having an opening $b$ through which the impression hammer may act upon the way-bill card in the holder, and having a light, thin, flat spring supporting plate $B^1$ secured thereto for the way-bill card X to rest directly upon, and between which spring and the holder the way bill card is inserted, the spring supporting plate serving to hold the way bill card free from the type wheel excepting at the instant when the impression hammer strikes its blow thereagainst, and thus carries the yieldingly supported way-bill card forcibly against the printing wheel and stationary pointer mark type. The yielding or spring supporting plate B¹ of the card holder is provided with an opening b¹ through it to enable the way bill card when struck by the impression hammer, to properly contact with the weight recording wheel and the stationary pointer mark type. The card holder B is also provided with a side guide b² for the rear side edge x of the folded way bill card X to abut against, and with an end guide b³ for one end edge x¹ of the way bill card to abut against so that when the way bill card is inserted into the holder, and pushed against these guides, the printing of the weight thereon will always occur in proper place on the way-bill card opposite the word or words thereon indicating the gross weight.

The front edges of the card holder B and of its spring supporting plate B¹ are preferably furnished with curved lips b⁴ b⁵ to facilitate the entrance of the folded way-bill card into the holder. The way-bill card holder B is adjustably supported in coöperative relation with the printing wheel and stationary pointer mark type by means of threaded posts or adjusting screws b⁶.

The inking ribbon C passes from the feed spool D to the takeup spool D¹ through the card holder B and just under the side guides b², and just beneath the spring or yielding supporting plate B¹ of the card holder, and around or over suitable guide rolls d d¹ d². The inking ribbon is held normally out of contact with the printing wheel A⁶ by suitable guides b⁷. The inking ribbon takeup spool is automatically actuated through suitable gears d⁴ d⁵, ratchet d⁶, pawl d⁷, pawl lever d⁸ and connecting link d⁹ which connects it with the lever A¹⁰ by which the impression hammer is raised.

I claim:—

1. In an automatic car weighing and recording scale, the combination with the scale beam, printing wheel, rack, and gear, stationary pointer mark type and impression hammer, ink ribbon and ink ribbon feed mechanism, of a way-bill card holder having upper and lower plates with an opening between them at their front edges to receive a way bill card, said upper plate having an opening for the impression hammer to project through, and said lower plate having an opening through which the printing wheel may contact with the card and serving to support the card normally out of contact with the printing wheel, and provided with a spring member movable toward the printing wheel to permit the card to be depressed against the printing wheel by the blow of the impression hammer, substantially as specified.

2. In an automatic car weighing and recording scale, the combination with the scale beam, printing wheel, rack, and gear, stationary pointer mark type and impression hammer, ink ribbon and ink ribbon feed mechanism, of a way-bill card holder having upper and lower plates with an opening between them at their front edges to receive a way bill card, said upper plate having an opening for the impression hammer to project through, and said lower plate having an opening through which the printing wheel may contact with the card and serving to support the card normally out of contact with the printing wheel, and provided with a spring member movable toward the printing wheel to permit the card to be depressed against the printing wheel by the blow of the impression hammer, said card holder being also furnished with side and end guides to gage the card in proper position, substantially as specified.

3. In an automatic car weighing and recording scale, the combination with the scale beam, printing wheel, rack, and gear, stationary pointer mark type and impression hammer, ink ribbon and ink ribbon feed mechanism, of a way-bill card holder having upper and lower plates with an opening between them at their front edges to receive a way bill card, said upper plate having an opening for the impression hammer to project through, and said lower plate having an opening through which the printing wheel may contact with the card and serving to support the card normally out of contact with the printing wheel, and provided with a spring member movable toward the printing wheel to permit the card to be depressed against the printing wheel by the blow of the impression hammer, said card holder being also furnished with side and end guides to gage the card in proper position, and adjustable supports for said card holder, substantially as specified.

4. The combination with a scale beam and a recording wheel actuated thereby, of an impression hammer and a card holder interposed between said impression hammer and recording wheel and having upper and lower plates provided with openings therein to enable the impression hammer and recording wheel to contact with the card held in the holder, substantially as specified.

5. The combination with a scale beam and a recording wheel actuated thereby, of an impression hammer and a card holder interposed between said impression hammer and recording wheel and having upper and lower plates provided with openings therein to enable the impression hammer and recording wheel to contact with the card held in the holder, said lower plate being movable toward the recording wheel under the stroke of the impression hammer, substantially as specified.

6. The combination with a scale beam and a recording wheel actuated thereby, of an impression hammer and a card holder interposed between said impression hammer and recording wheel and having upper and lower plates provided with openings therein to enable the impression hammer and recording wheel to contact with the card held in the holder, said card holder being provided with side and end guides for gaging the card in position, substantially as specified.

7. The combination with a scale beam and a recording wheel actuated thereby, of an impression hammer and a card holder interposed between said impression hammer and recording wheel and having upper and lower plates provided with openings therein to enable the impression hammer and recording wheel to contact with the card held in the holder, an ink ribbon and ink ribbon feed mechanism, substantially as specified.

8. The combination with a scale beam and a recording wheel actuated thereby, of an impression hammer and a card holder interposed between said impression hammer and recording wheel and having upper and lower plates provided with openings therein to enable the impression hammer and recording wheel to contact with the card held in the holder, and screw posts for supporting said card holder in coöperative relation with the recording wheel, substantially as specified.

9. The combination with a scale beam and recording wheel connected therewith and actuated thereby, of a stationary pointer mark type, an impression hammer and a card holder having upper and lower plates and an opening in its upper plate for the impression hammer and provided with a flat spring supporting plate for yieldingly supporting the card normally out of contact with the recording wheel, substantially as specified.

10. The combination with a scale beam and recording wheel connected therewith and actuated thereby, of a stationary pointer mark type, an impression hammer and a card holder having upper and lower plates and an opening in its upper plate for the impression hammer and provided with a flat spring supporting plate for yieldingly supporting the card normally out of contact with the recording wheel, and a side guide for the back edge of the card, substantially as specified.

11. The combination with a scale beam and recording wheel connected therewith and actuated thereby, of a stationary pointer mark type, an impression hammer and a card holder having upper and lower plates and an opening in its upper plate for the impression hammer and provided with a flat spring supporting plate for yieldingly supporting the card normally out of contact with the recording wheel, and a side guide for the back edge of the card, and an end guide for one end edge of the card, substantially as specified.

12. The combination with a scale beam and a recording wheel actuated thereby, of an impression hammer and a card holder interposed between said impression hammer and recording wheel and having upper and lower plates provided with openings therein to enable the impression hammer and recording wheel to contact with the card held in the holder, and screw posts for supporting said card holder in coöperative relation with the recording wheel, and means for adjusting said card holder in respect to the said wheel, substantially as specified.

13. The combination with a scale beam and a recording wheel actuated thereby, of an impression hammer and a card holder interposed between said impression hammer and recording wheel and having upper and lower plates provided with openings therein to enable the impression hammer and record ing wheel to contact with the card held in the holder, and screw posts for supporting said card holder in coöperative relation with the recording wheel, an ink ribbon and feed mechanism therefor, substantially as specified.

GEORGE GOETZ.

Witnesses:
PEARL ABRAMS,
H. M. MUNDAY.